(12) United States Patent
Lippert (10) Patent No.: US 6,467,032 B1
(45) Date of Patent: Oct. 15, 2002

(54) CONTROLLED REISSUE DELAY OF MEMORY REQUESTS TO REDUCE SHARED MEMORY ADDRESS CONTENTION

(75) Inventor: Gary Michael Lippert, Kasson, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/325,817

(22) Filed: Jun. 4, 1999

(51) Int. Cl.[7] .............................................. G06F 12/00
(52) U.S. Cl. ........................ 711/150; 711/151; 711/153
(58) Field of Search ................................. 711/150, 130, 711/147, 153, 151; 710/36

(56) References Cited

U.S. PATENT DOCUMENTS

| | | | | |
|---|---|---|---|---|
| 5,282,272 A | * | 1/1994 | Guy et al. ................... | 710/116 |
| 5,634,004 A | * | 5/1997 | Gopinath et al. ........... | 710/132 |
| 6,084,856 A | * | 7/2000 | Simmons et al. ........... | 370/235 |
| 6,108,755 A | * | 8/2000 | Kabemoto et al. .......... | 711/147 |

OTHER PUBLICATIONS

"Programmable Variable Random Retry Delay Based on Identifiers", IBM® Technical Disclosure Bulletin, vol. 40, No. 02 (Feb. 1997), pp. 157–158.

* cited by examiner

Primary Examiner—Matthew Kim
Assistant Examiner—Matthew D. Anderson
(74) Attorney, Agent, or Firm—Wood, Herron & Evans LLP; Scott A. Stinebruner (57) ABSTRACT

In a shared memory system, a plurality of requesters issue requests for particular memory addresses over a system bus. Requests, if denied, are later reissued after a controlled reissue delay. The reissue delay for a particular request is controllably varied in response to the number of requests being issued by requesters other than that which issued the request. Typically, the number of requests issued by other requesters for a common memory address as the particular request is tracked, and the reissue delay is controllably increased as the number of such requests increases. As such, the frequency that requests for highly contended memory addresses (which are more likely to be denied) is decreased relative to requests for less contended addresses, thereby freeing bandwidth on the system bus for requests that are more likely to be granted.

28 Claims, 3 Drawing Sheets

CONTROLLED REISSUE DELAY OF MEMORY REQUESTS TO REDUCE SHARED MEMORY ADDRESS CONTENTION

FIELD OF THE INVENTION

The invention is generally related to data processing systems and processors therefor, and in particular to retrieval of data from a shared memory architecture.

BACKGROUND OF THE INVENTION

Computer technology continues to advance at a remarkable pace, with numerous improvements being made to the performance of both microprocessors—the "brains" of a computer—and the memory that stores the information processed by a computer. In general, a microprocessor operates by executing a sequence of instructions that form a computer program. The instructions are typically stored in a memory system having a plurality of storage locations identified by unique memory addresses. The memory addresses collectively define a "memory address space," representing the addressable range of memory addresses that can be accessed by a microprocessor.

A number of computer designs utilize multiple microprocessors operating in parallel with one another to increase overall computing performance. In a symmetric multiprocessing (SMP) environment, for example, multiple microprocessors share at least a portion of the same memory system to permit the microprocessors to work together to perform more complex tasks. The multiple microprocessors are typically coupled to one another and to the shared memory by a system bus or other like interconnection network.

Many shared memories use multiple levels and arrangements of memory sources to increase system performance in a cost-effective manner. A shared memory, for example, may utilize a relatively large, slow and inexpensive mass storage system such as a hard disk drive or other external storage device, an intermediate main memory that uses dynamic random access memory devices (DRAM's) or other volatile memory storage devices, and one or more high speed, limited capacity cache memories, or caches, implemented with static random access memory devices (SRAM's) or the like. One or more memory controllers are then used to swap the information from segments of memory addresses, often known as "cache lines", between the various memory levels to attempt to maximize the frequency that memory addresses requested by a memory requester such as a microprocessor are stored in the fastest cache memory accessible by that requester. In a typical SMP environment, for example, each microprocessor may have one or more dedicated cache memories that are accessible only by that microprocessor (e.g., level one (L1) data and/or instruction caches, and/or a level two (L2) cache), as well as one or more levels of caches and other memories that are shared with other microprocessors in the computer.

Whenever more than one microprocessor shares access to a memory, a number of concerns arise. One concern is that the status of all data stored in a shared memory is kept current throughout the memory, a process known as maintaining "coherence." Otherwise, a microprocessor might access stale data from a memory address stored in one memory source that has not been updated to reflect changes made to another copy of the same data stored in another memory source, which could lead to unpredictable results in the computer.

To maintain coherence, memory requesters such as microprocessors are granted exclusive or shared "ownership" of certain cache lines in response to requests issued to a shared memory over a system bus. Further, a process known as "address contention" is used to arbitrate between multiple requesters that attempt to access the same cache line at the same time, such that only one requester is granted access to the cache line at any given time. Requests are also tracked by a central directory or via a distributed mechanism known as "snooping" to maintain up to date information about the currency of the data stored in each memory source. With snooping, each memory source maintains local state information about what data is stored in the source and provides such state information to other sources over the system bus in the form of a response, so that the location of valid data in the shared memory address range can be ascertained.

Memory requests issued by microprocessors, and the responses returned by the memory sources in the shared memory, can occupy an appreciable amount of bandwidth on a system bus—so much so that system performance can be hindered by an excessive number of requests being issued by microprocessors. Of particular concern are requests issued for cache lines that are currently owned by other microprocessors and requests issued for cache lines where the ownership is in transition, since such requests are initially denied, and must later be reissued should the requester still desire to access the requested cache lines. A fixed delay is typically used by each requester that determines when a request is reissued by the requester. With the future availability of a cache line being unknown to a requesting microprocessor, however, deciding precisely when to reissue a request can have a significant impact on system performance.

From the perspective of a requesting microprocessor, the optimum performance occurs when a request is issued as soon as possible after a requested cache line becomes available. As such, one option is to reissue requests as often as possible until the requested cache line becomes available. However, given the limited bandwidth of a system bus, repeated unsuccessful requests can reduce the amount of bandwidth available for requests for other cache lines. Thus, other microprocessors, which may not need to access the same cache line, may nonetheless be slowed by backups on the system bus. The other option is to increase the delay before a request is reissued, but doing so may increase the delay before the request is ultimately granted, thus slowing the performance of the requesting microprocessor.

Consequently, a trade-off currently exists between minimizing the delay or latency associated with providing access to contending cache lines and maintaining suitable bandwidth on a system bus for performing operations on other cache lines in a shared memory. As such, a significant need exists for an improved manner of balancing these concerns and thereby increasing overall system performance.

SUMMARY OF THE INVENTION

The invention addresses these and other problems associated with the prior art by providing a data processing system, circuit arrangement, integrated circuit device, program product, and method that controllably vary the amount of delay before reissuing a request based upon the detection of one or more requests being issued by other requesters coupled to a shared memory.

For example, in one particularly beneficial, but not exclusive application, the number of requests issued by other requesters for a common memory address (e.g., a common cache line) as a particular request is tracked and utilized to controllably vary reissue delay. Moreover, while other relationships between the reissue delay and the number of common requests (also referred to herein as "collisions") may be used, it is often desirable to in general increase the reissue delay as the number of collisions increase. Doing so permits requests associated with relatively fewer collisions to be issued more frequently than those associated with relatively more collisions. Given that requests associated with relatively fewer collisions typically have a greater likelihood of being granted (due to less address contention), greater bandwidth on the system bus is essentially reserved for such requests. A better balance between maintaining system bandwidth and minimizing individual request latencies thus results, and overall system performance is accordingly improved.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
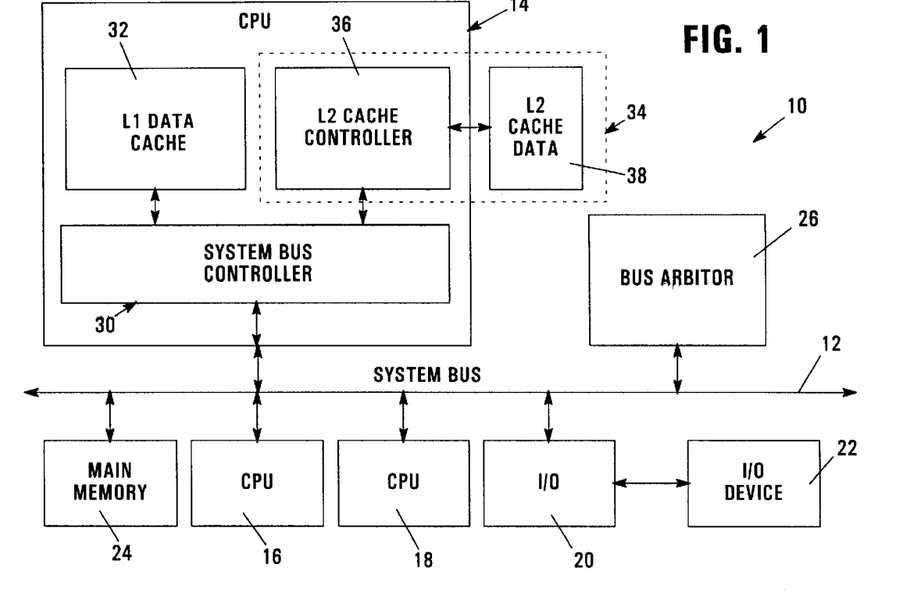
FIG. 1 is a block diagram of a data processing system consistent with the invention.

Turning to the Drawings, wherein like numbers denote like parts throughout the several views, FIG. 1 illustrates the general configuration of an exemplary apparatus or data processing system 10 consistent with the invention. System 10 generically represents, for example, any of a number of multi-user computer systems such as a network server, a midrange computer, a mainframe computer, etc. However, it should be appreciated that the invention may be implemented in other data processing systems, e.g., in stand-alone or single-user computer systems such as workstations, desktop computers, portable computers, and the like, or in other computing devices such as embedded controllers and the like. One suitable implementation of data processing system 10 is in a midrange computer such as the AS/400 computer available from International Business Machines Corporation.

Data processing system 10 generally includes a system bus 12 that couples together a plurality of electronic components, e.g., any number of central processing units (CPU's) 14, 16 and 18, and input/output controller 20 (which couples the bus to one or more input/output devices such as I/O device 22) with a main memory 24. The data processing system 10 typically includes a shared memory incorporating an addressable memory address space including a plurality of memory addresses. The actual data stored at such memory addresses in the shared memory may be maintained in main memory 24, or may be selectively paged in and out of main memory 24, e.g., into a direct access storage device (DASD) (not shown). Moreover, copies of selective portions of the memory addresses in the memory space may also be duplicated in various memories found in the various electronic components 14–20 coupled to system bus 12. The system bus acts as a shared memory interface that permits the various electronic components to share memory in a controlled fashion, and in this regard, a bus arbiter 26 is typically used to selectively control the access to the bus by each of the electronic components to prevent collisions between the components from occurring. In other embodiments, however, it should be appreciated that bus arbitration may be implemented in a distributed manner with suitable logic disposed in each component coupled to the system bus.

For caching purposes, the shared memory address space is partitioned into a plurality of cache lines, or contiguous sequences of memory addresses that are always swapped into and out of caches as single units. By organizing memory addresses into defined cache lines, decoding of memory addresses in caches is significantly simplified, thereby significantly improving cache performance. By stating that a sequence of memory addresses forms a cache line, however, no implication is made whether the sequence of memory addresses are actually cached at any given time.

As illustrated by CPU 14, each CPU typically includes a system bus controller 30 that provides an interface between the system bus and one or more local memories, e.g., a level one (L1) data cache 32 and a level two (L2) cache 34 with an integrated cache controller 36 and an off-chip cache memory device 38. An L1 instruction cache and a transition cache (not shown) may also be provided, and L1 data cache 32 may alternatively be implemented as a combined data/instruction cache. Moreover, it should be appreciated that any of the various caches may be completely integrated into a common integrated circuit device (e.g., with cache 32), or may be partially or completely integrated on separate integrated circuit devices from CPU 14 (e.g., with cache 34). Moreover, it should be appreciated that CPU 14 also utilizes a number of additional components that have been omitted from FIG. 1 for ease of understanding, e.g., instruction units, fixed point units, floating point units, etc. In general, it should be appreciated that a wide variety of suitable hardware implementations may be used in the alternative.

Data processing system 10 includes multiple requesters, illustrated here by CPU's 14, 16 and 18, that are capable of requesting information, in the form of one or more cache lines, from any component having the most current copy of the information. In some embodiments, each CPU may also incorporate more than one requester, e.g., if multiple processing units are supplied in the CPU, and/or if each cache memory in the CPU is capable of issuing requests separately from other cache memories. In addition, in some implementations requesters may be capable of issuing multiple requests.

Data processing system 10 may implement any of a number of known request/response protocols over system bus 12 to transfer cache lines between the various components having access to the shared memory. For example, in the illustrated embodiment, a snoopy coherence protocol is used, whereby any component 14–18 is permitted to issue memory access requests over the system bus to access information stored in the main memory or in any other such component. Such requests are then monitored, or "snooped" by all other components, each of which provides a local response to each request indicating whether the requested information is stored in that component. The component responses are combined into a combined response that is returned to each component to enable the component to update its local state information. Moreover, the component (if any) having the most recent copy of the requested information returns that information to the requester over the system bus.

It should be appreciated that multi-level coherence protocols, e.g., where cache lines are requested first from other cache memories in the same component before passing the request to other components via the system bus, may also be used. It should further be appreciated that the general implementation of a snoopy coherence protocol is understood in the art. Moreover, other coherence protocols, e.g., directory-based protocols, may also be used in the alternative. Furthermore, the invention may be utilized in other applications where multiple requesters are capable of accessing a shared memory, e.g., for use with input/output (I/O) memory and/or memory mapped I/O resources, among others. Thus, the invention should not be limited to use with the particular implementations described herein.

As should be apparent from the foregoing, an innumerable number of alternate hardware arrangements may be utilized consistent with the invention. Moreover, as is well known in the art, such hardware arrangements may be implemented in circuit arrangements comprising one or more integrated circuit devices, not to mention other support circuitry. It will also be appreciated that integrated circuit devices and the like are typically designed and fabricated using one or more computer data files, referred to herein as hardware definition programs, that define the layout of the circuit arrangements on the devices. The programs are typically generated by a design tool and are subsequently used during manufacturing to create the layout masks that define the circuit arrangements applied to a semiconductor wafer. Typically, the programs are provided in a predefined format using a hardware definition language (HDL) such as VHDL, verilog, EDIF, etc. While the invention has and hereinafter will be described in the context of circuit arrangements implemented in fully functioning integrated circuit devices and data processing systems utilizing such devices, those skilled in the art will appreciate that circuit arrangements consistent with the invention are also capable of being distributed as program products in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, magnetic tapes, CD-ROM's, and DVD's, among others and transmission type media such as digital and analog communications links.

In the illustrated embodiment, a number of different responses may be provided in reply to an issued request. For example, a number of responses containing state information about the requested data may be provided, e.g., in the MESI (modified, exclusive, shared, invalid) protocol. These responses are also termed "non-retry" responses because the responses are complete, and do not require reissuance of the original request to which the responses are directed.

In addition to non-retry responses, a "retry" response type is also supported to indicate an inability to process a request by one or more components accessible via the shared memory. A retry response may be returned, for example, whenever a component is busy processing other pending requests, whenever a component is unable to receive additional requests, whenever a component is performing an operation on the requested information, whenever a cache line is in an unknown state, or whenever a cache directory is busy, among others. In such instances, a requester is required to reissue, or retry, a request at a later time to access the originally requested information.

Given that other requesters may also attempt to gain access to the same information, the illustrated implementation controls a retry delay for a requester at least in part based upon the number of requests issued by other requesters for the same information, also referred to herein as a contending cache line. As will become more apparent below, controlling the retry delay in this manner may be used to reduce the frequency of requests for contending cache lines, thereby freeing up bandwidth on the system bus for performing other operations, and often improving the overall performance of the data processing system.

Figure 2:
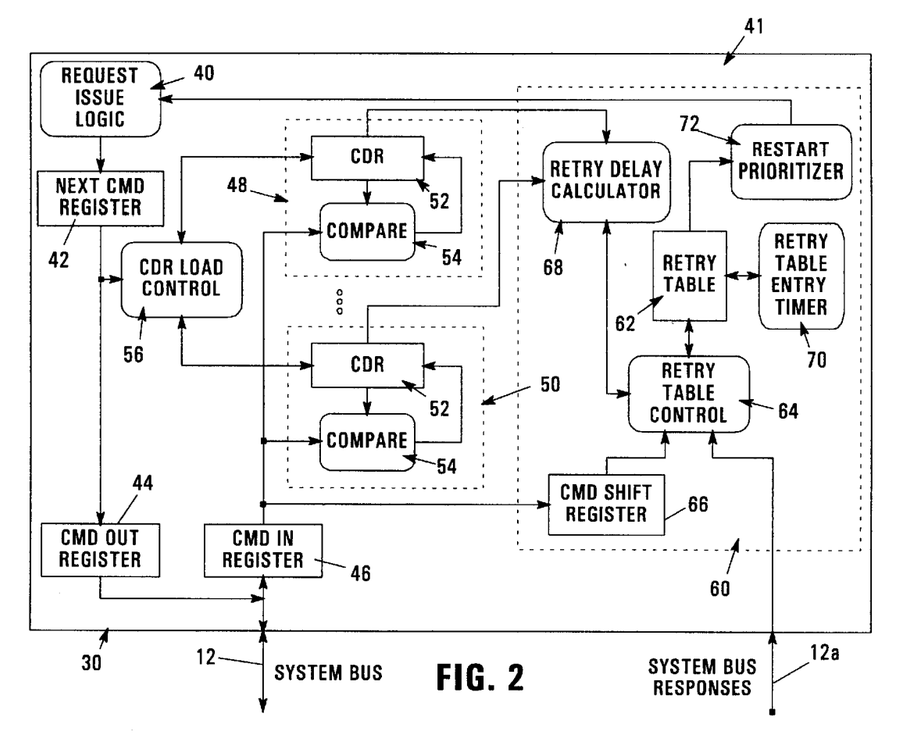
FIG. 2 is a block diagram of the system controller shown in FIG. 1.

A system controller 30 is illustrated in greater detail in FIG. 2, including a first, request issue logic circuit 40 coupled to a second, reissue delay control circuit 41, used to controllably vary the reissue delay prior to reissuing a denied request.

Request issue logic 40 is used to issue requests, or commands, that are initiated by a processing unit or other component in CPU 14. It will be appreciated that a number of suitable requests to format protocols may be utilized. Thus, the precise configuration of request issue logic circuit 40 may vary for different applications, and need not be discussed in further detail herein. It will also be appreciated that the terms "retry" and "reissue" are used interchangeably herein, as are the terms "request" and "command".

Circuit 40 outputs commands to be issued to a next command register 42. The output of next command register 42 is provided to a command out register 44 that is coupled to system bus 12 for the purpose of outputting a command on the system bus when the system controller has been granted control over the bus by the bus arbiter (in a manner well known in the art). Incoming commands from the system bus are received by a command in register 46, which outputs received commands to one or more collision detection circuits (e.g., collision detection circuits 48, 50) for the purpose of tracking collisions between pending commands and those generated by other requesters on the system bus. In one embodiment, for example, a total of three collision detection circuits may be used.

Each collision detection circuit 48, 50 includes a collision detection register (CDR) 52 under the control of a compare logic circuit 54. Each CDR stores (among other information) an identifier for a command being tracked, as well as a collision count that reflects the number of commands issued by other requesters that match the identifier of the tracked command. The compare logic circuit is generally configured to compare commands stored in command in register 46 with that being tracked by the associated collision detection circuit, and to increment the collision count (via an increment signal output to the associated CDR 52) whenever a matching command is received.

Figure 3:
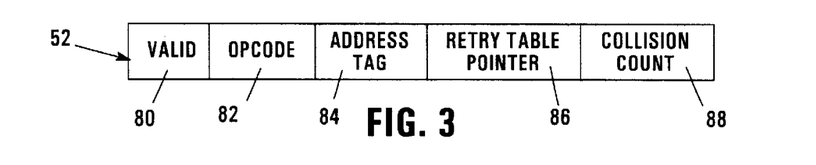
FIG. 3 is a block diagram of the collision detect register shown in FIG. 2.

As shown in FIG. 3, one suitable format for CDR 52 is illustrated including a plurality of fields 80–88 within which various information about a command being tracked is stored. Field 80 stores a valid indicator, e.g., a valid bit, that indicates whether that collision detection circuit is currently in use. Fields 82 and 84 respectively store an opcode and address tag (typically a cache line identifier) associated with the command being tracked. Field 86 stores a pointer to a retry table entry associated with the command being tracked, and field 88 stores a collision count indicating the current number of collisions (i.e., other commands received for the same cache line) for the command being tracked. It should be appreciated that each of fields 80–88 may have various widths depending upon the particular implementation. Moreover, alternate or additional information may also be stored in each register, and further, the collision count and command identifier may be maintained in separate data storage, rather than within the same register, in other implementations.

Returning to FIG. 2, each CDR 52 is controlled by a CDR load control circuit 56, which is configured to initialize each CDR with commands output by the request issue logic such that such commands may be tracked by the collision detection circuits. As such, CDR load control circuit 56 is coupled to the output of next command register 42 to receive the next command being issued by the request issue logic 40.

Circuit 41 further includes a retry circuit 60 that receives as input the commands broadcast over system bus 12 via command in register 46, as well as the data stored in each CDR 52. Retry circuit 60 includes a retry table 62 within which is stored a plurality of entries used to track pending commands for which is desirable to retry or reissue after a controlled reissue delay.

Figure 4:
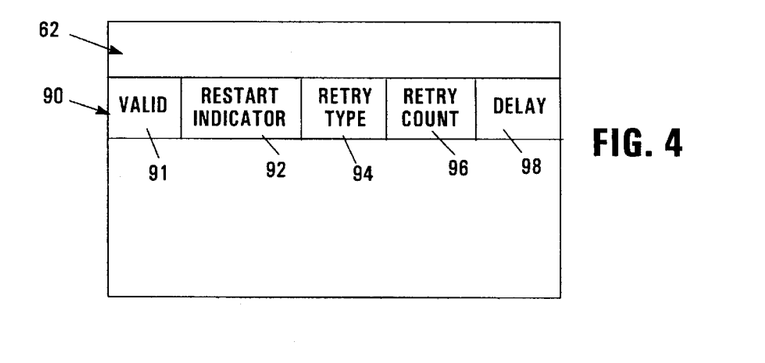
FIG. 4 is a block diagram of the retry table shown in FIG. 2.

As shown in FIG. 4, for example, one suitable format for a retry table entry 90 in retry table 62 is illustrated, including a plurality of fields 91–98. Any entry 90 can be associated with one of the CDR's by storing a pointer (e.g., an index value) to a particular entry in the associated CDR. In the alternative, a one-to-one mapping of CDR's to retry table entries may be used, whereby a pointer would not be required.

Any number of entries (e.g., the same as the number of possible outstanding commands that may be handled by the requester) may be utilized within a retry table consistent with the invention. As such it may be desirable to statically map each entry to a particular type of command. Other manners of mapping retry table entries to particular outstanding commands (e.g., dynamic mapping), as well as other manners of storing retry data for use by the retry circuit may also be used in the alternative.

Field 91 of each entry 90 is a valid indicator, e.g., a valid bit, indicating whether the entry is currently in use. Field 92 stores a restart indicator, e.g., a restart bit, which is polled to determine whether reissue of the command associated with the table entry is authorized.

Field 94 stores a retry type, which is an optional value that permits multiple types of retries to be utilized by the system controller. For example, it may be desirable in some implementations to support both early retries and coherency retries, with the early retry type assigned to retries that are immediately returned due to an inability of a destination component for a particular command to even accept the request. Coherency retries, on the other hand, are typically used to handle coherency conflicts, busy directory situations, transitioning ownership situations, and unknown states.

Field 96 stores a retry count, indicating the number of times a particular command has been reissued. Field 98 stores a reissue delay that has been calculated for use in reissuing a particular command.

Returning again to FIG. 2, retry table 62 is manipulated by a retry table control logic circuit 64. Circuit 64 receives commands placed on the system bus via a command shift register 66 coupled to the output of command in register 46. The command shift register is utilized to align commands with associated responses provided over lines 12a of the system bus. It should be appreciated that the system bus responses may be provided over separate lines from the commands provided to the command in register, or in the alterative may be provided on the same system bus lines, and decoded via decoding logic (not shown) to pull off appropriate responses for forwarding to retry table control logic circuit 64.

The delay associated with reissuing a command is calculated by a retry delay calculator logic circuit 68 coupled to the selected CDR 52 and retry table entry 90. Moreover, the calculated reissue delays are used by a retry table entry timer 70 to controllably delay reissuance of commands stored in the retry table, in the manner discussed below. Furthermore, a restart prioritizer circuit 72 is coupled to retry table 62 to periodically poll the restart indicators stored in the various retry table entries to detect when a particular command is authorized to be reissued.

Returning now to FIG. 5, retry delay calculator logic circuit 68 is illustrated in greater detail. Retry delay calculator logic circuit 68 is principally used to generate a reissued delay value (in units of system bus cycles) for use in controllably varying the delay to reissue pending commands. In the illustrated implementation, a pseudo-random delay value, constrained within a predetermined range by both retry count and collision count, is generated by circuit 68. The purpose of generating a pseudo-random delay value is to minimize the possibility of cyclic operations, which could otherwise generate deadlock situations where contending commands issued by multiple requesters are never resolved. However, in other implementations the generation of a random value may not be required, and instead the retry delay calculator logic circuit may output a fixed delay count based upon the collision count, and optionally further based on the retry count, provided to the circuit.

Figure 5:
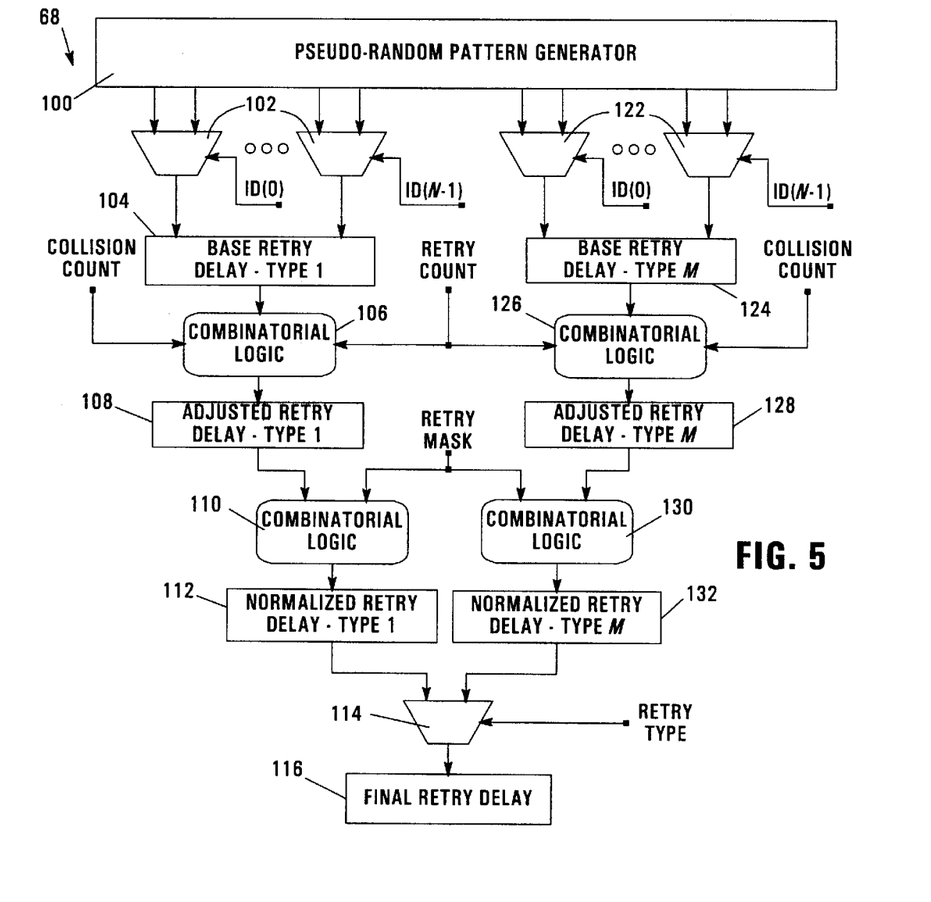
FIG. 5 is a block diagram of the retry delay calculator circuit shown in FIG. 2.

Logic circuit 68 includes a maximal length pseudo-random pattern generator (PRPG) 100 having a plurality of output lines interfaced with a plurality of multiplexers 102, 122. The use and configuration of PRPG's, many of which may be used in the instant implementation, are well known in the art. In the illustrated implementation, a plurality of paths are used to separately calculate a reissue delay based upon the retry type received as a response to the request. As discussed above, in some implementations early and collision retry types may be supported. In such implementations, early retries may benefit from relatively longer reissue delays than coherency retries, such that the separate execution paths may be configured to calculate relatively shorter or longer reissue delays responsive to the retry type.

One retry type path is represented by components 102–112, and another such path is represented by components 122–132. Selection of one of the two paths is made by a multiplexer 114 selected via a retry type indicator, which outputs a final retry delay to a register 116 for use by the retry table control in storing a reissue delay value in the appropriate retry table entry for the command to be reissued. It should be appreciated that any number of retry types may be supported in different applications. Also, only one type of retry response may be supported, whereby only one calculation path would be required, and multiplexer 114 and register 116 could be omitted.

In the illustrated implementation, the size of the PRPG 100 is determined by the maximum number of requesters in the data processing system and number of different types of retries that are supported. The width is calculated by taking the log base 2 of the number of requesters multiplied by the number of retry types multiplied by two. For example, in a system with twelve requesters and two retry types, a 16-bit PRPG may be used($\log_2(12) \times 2 \times 2 = 4 \times 2 \times 2 = 16$).

Each requestor is associated with a unique device identifier (ID) to select a different combination of output lines from the PRPG for each retry type. Each bit of the ID is supplied to a different multiplexer 102 for use in selecting among a pair of output lines from PRPG 100. For example, it may be desirable to use five multiplexers 102 to output a 5-bit value comprised of one of 16 different combinations of output lines from the PRPG, based upon the requester ID. Configuring logic circuit 68 in this manner permits each requester in a data processing system to utilize a different sequence of random numbers output by the PRPG, even if the PRPG's in any two requesters follow the same pseudo-random output sequences.

The collective outputs of multiplexers 102 are fed to a base retry delay register 104, the output of which is then combined with a retry count and a collision count in a combinatorial logic block 106 to generate an adjusted retry delay (here implemented as a 6-bit value), which is stored in register 108. Combinatorial logic block 106 implements a delay range table that scales or adjusts the base retry delay stored in register 104 to fall within a predetermined range based upon the retry and collision counts supplied to the block. Block 106 takes the base retry delay and scales the delay to fall within a range by determining whether the base delay exceeds a maximum value specified per range, and if so, masking one or more high order bits from the base delay to bring the delay below the specified maximum value for the range. Next, if the base delay (or the masked base delay, if the base delay was above the maximum value of the range) falls below the minimum value, the minimum value for the range is selected as the adjusted delay count. The resulting adjusted retry delay is therefore a pseudo-random number, constrained to fall within a predefined range.

A number of delay range table implementations may be utilized in the illustrated implementation. For example, Table I illustrates one suitable array of range minimum and maximum values based upon a 5-bit collision count and 8-bit retry count supplied to combinatorial logic block 106:

TABLE I

Exemplary Delay Range Table

| Collisions/Retries | 0 | 1–3 | 4–7 | 8–15 | 16+ |
|---|---|---|---|---|---|
| 0–1 | 1 . . . 3 | 1 . . . 7 | 4 . . . 15 | 8 . . . 31 | 16 . . . 63 |
| 2–3 | 1 . . . 7 | 1 . . . 7 | 4 . . . 15 | 8 . . . 31 | 16 . . . 63 |
| 4–7 | 1 . . . 15 | 1 . . . 15 | 4 . . . 15 | 8 . . . 31 | 16 . . . 63 |
| 8–15 | 4 . . . 15 | 4 . . . 15 | 4 . . . 15 | 8 . . . 31 | 16 . . . 63 |
| 16–31 | 8 . . . 31 | 8 . . . 31 | 8 . . . 31 | 8 . . . 31 | 16 . . . 63 |
| 32–63 | 16 . . . 31 | 16 . . . 31 | 16 . . . 31 | 16 . . . 31 | 16 . . . 63 |
| 64–127 | 16 . . . 63 | 16 . . . 63 | 16 . . . 63 | 16 . . . 63 | 16 . . . 63 |
| 128+ | 32 . . . 63 | 32 . . . 63 | 32 . . . 63 | 32 . . . 63 | 32 . . . 63 |

As can be seen from Table I, it is desirable in the illustrated implementation to increase the range minimums and maximums as the number of collisions and/or retries increases. As such, commands associated with highly contended cache lines, as well as commands that have been retried a large number of times (both of which are less likely to receive non-retry responses), are delayed relatively longer than other commands. It should be appreciated that Table I is merely exemplary, and that a wide number of other range arrays may be utilized in the alternative.

Returning to FIG. 5, the adjusted retry delay stored in register 108 is next combined with a retry mask in a combinatorial logic block 110 to generate a normalized retry delay, stored in register 112. The retry mask forms an alternate method to set the maximum retry delay, by essentially masking off selected bits based upon the value stored in the retry mask. The mask value may be programmed into a programable register, for example, that can be adjusted based upon system configuration. To implement the retry mask operation, combinatorial logic block 110 may simply utilize a combination of AND gates to mask off any bits that are not asserted in the retry mask.

Once a normalized retry delay value is stored in register 112, the retry delay is passed to the final retry delay register 116 based upon selection of the appropriate retry type selection signal into multiplexer 114. The value stored in register 116 is subsequently stored in a retry table entry to initialize the timer that controls the reissue delay for the command associated therewith.

It should be appreciated that components 122–132 operate in generally the same manner as components 102–112 discussed above, although various functions, e.g., the combinatorial logic blocks 126, 130 and the arrangement of output lines between PRPG 100 and multiplexers 122, may vary such that an alternate pattern, as well as alternate ranges of suitable delay values, may be selected based upon retry type.

A wide variety of alternate features may be utilized in logic circuit 68 consistent with the invention. For example, the use of a retry mask may be omitted, thereby eliminating the need for the associated combinatorial logic block and additional register (e.g., block 110 and register 112 for the path represented by components 102–112). Also, combinatorial logic block 106 need not be responsive to retry count in some implementations. It will further be appreciated that the implementation of the above-described logic in any of components 106, 110, 126 and 130 is well within the ability of one of ordinary skill in the art having the benefit of the instant disclosure. Moreover, other ranges and/or widths of delay values may be used in other implementations consistent with the invention.

Figure 6:
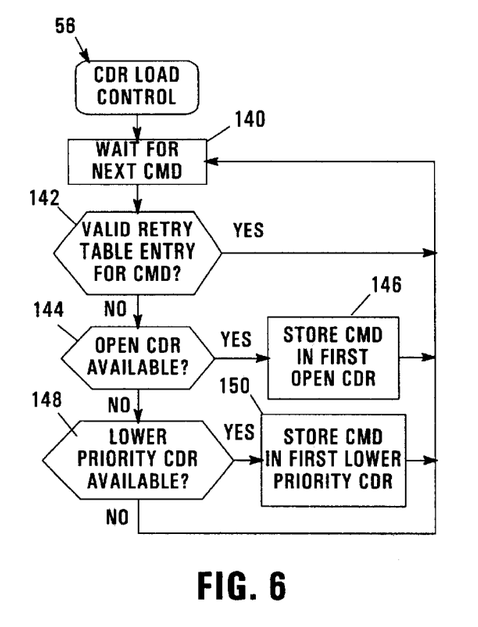
FIG. 6 is a flowchart illustrating the logic flow implemented in the CDR load control logic circuit of FIG. 2.

FIG. 6 next illustrates the logic flow utilized in CDR load control logic circuit 56. CDR load control logic circuit 56 operates on each command provided as an output from the next command register 42 (FIG. 2), as represented by block 140. In response to receiving such a command, block 140 passes control to block 142 to determine whether a valid retry table entry exists for the next command, typically by determining whether the command identifier in any valid CDR 52 (i.e., a CDR with an asserted valid indicator) matches the current command. In such an instance, the outgoing command is a reissue of an earlier command being tracked by the associated CDR, so control can return to block 140 without additional processing by logic circuit 56.

If not, however, the command is not currently being tracked. Therefore, to establish tracking for the command, control passes to block 144 to determine whether an open CDR is available, typically by polling the valid bits for each CDR 52. If an open CDR is available, block 146 stores the command in the first open CDR (or simply the one available CDR, if only one CDR is available), and passes control back to block 140. On other hand, if no open CDR is available, block 144 passes control to block 148 to determine whether a lower priority CDR is available. If not, no tracking of the command will occur, and control returns to block 140. If a lower priority CDR is available, however, control passes to block 150 to store the command in the first lower priority CDR 52. Control then returns to block 140. Whenever a command is stored in a CDR, the collision count and the retry table pointer fields in the CDR are reset and the valid indicator therefor is asserted.

The priority of a command stored in a CDR versus a command received from register 42 may be based, for example, on the approximate latency of the commands. For example, in the illustrated implementation, it may be desirable to give commands with longer latencies (e.g., load operations) relatively higher priorities than lower latency commands. Moreover, it should be appreciated that different CDR's may be allocated to different command types, and further that any number of CDR's may be utilized consistent with the invention. Further, in some implementations, priorities may not be defined, whereby blocks 148 and 150 would not be required.

Figure 7:
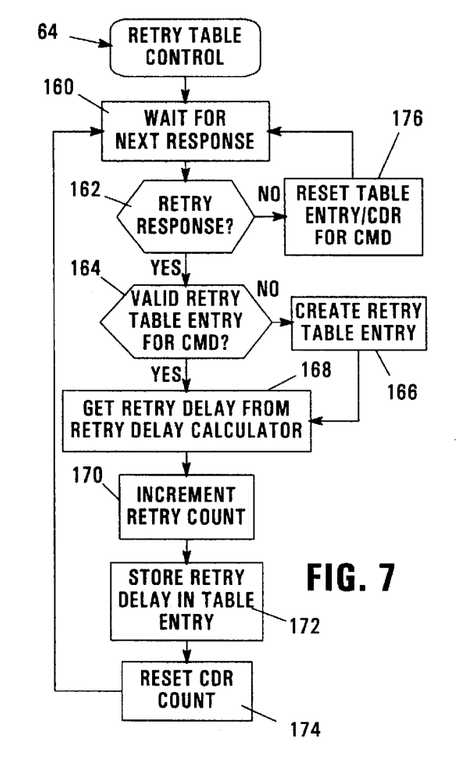
FIG. 7 is a flowchart illustrating the logic flow implemented in the retry table control logic circuit of FIG. 2.

FIG. 7 illustrates the logic flow of retry table control logic circuit 64. Logic circuit 64 is timed on the receipt of responses over the system bus lines 12a. Upon the receipt of such a response, block 160 passes control to block 162 to determine whether the response is a retry response. If so, control passes to block 164 to determine whether a valid retry table entry exists for the command for which the retry response has been received, typically by testing the valid bit for the entry corresponding to the command.

If not (indicating that the reply is to a first issuance of a particular command), control passes to block 166 to create a retry table entry associated with the command. Stored within the retry table entry is a retry type based upon the type of retry received. Moreover, the valid indicator is asserted for the entry, and the restart indicator therefor is reset. The retry count and retry delay values are also reset to zero values. Furthermore, the CDR associated with the command is updated to point to the new entry in the retry table.

As discussed above, each entry is associated with a particular command type. In the alternative, however, dynamic mapping of entries to commands may be used, and as such any number of manners may be utilized to select a free entry from the retry table. For example, a number of entries sufficient to track a predetermined number of commands may be used, with the first available slot (having an unasserted valid indicator) used as storage for the new entry.

As the retry table entry is being created in block 166, or in the alternative if a valid retry table entry was found for the command in block 164, control passes to block 168 to initialize the retry delay calculator logic circuit to calculate a retry delay based upon the retry count stored in the retry table entry (which is zero for a new entry) and the collision count stored in the CDR associated therewith. Next, in block 170 the retry count is incremented in the table entry, and in block 172, the retry delay returned from the retry delay calculator logic circuit is stored in the table entry. Next, in block 174 the collision count in the CDR 52 is reset. Control then returns to block 160 to wait for a next response over system bus lines 12a.

Returning to block 162, if a non-retry response is received (indicating that the command has been processed), control passes to block 176 to reset the valid indicators for the retry table entry and CDR associated with the command being responded to. Tracking of the command is then terminated, and control returns to block 160.

Figure 8:
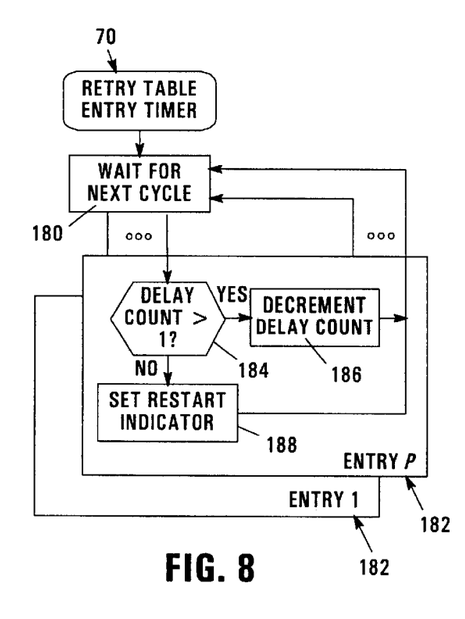
FIG. 8 is a flowchart illustrating the logic flow implemented in the retry table entry timer logic circuit of FIG. 2.

FIG. 8 illustrates the logic flow for the retry table entry timer logic circuit 70 consistent with the invention. Timer logic circuit 70 cycles during each successive bus cycle (or any other suitable time interval), as represented at block 180. During each such cycle, each entry 1 . . . P of the retry table is updated, as represented by the use of multiple parallel routines 182. For each such entry, it is determined in block 184 whether the delay count stored in the entry is greater than one. If so, control passes to block 186 to decrement the delay count in the entry. Control then returns to block 180 to wait for the next cycle or other time interval. Returning to block 184, if the delay count is not greater than one, control passes to block 188 to set the restart indicator in the entry, indicating to the restart prioritizer (discussed below) that the command associated with the retry table entry is ready to be reissued. As a result, whenever a delay count greater than one is stored in a retry table entry (as discussed above in connection with block 172), for every cycle thereafter, the delay count is decremented by one until the delay count reaches a value of one. Decrementing of the delay count is then suspended and the restart indicator is asserted by the timer.

Figure 9:
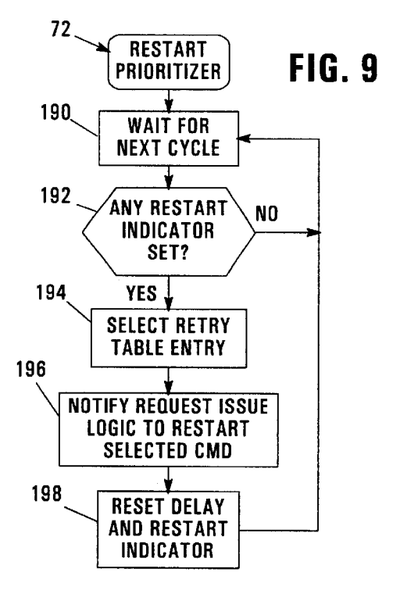
FIG. 9 is a flowchart illustrating the logic flow implemented in the restart prioritizer logic circuit of FIG. 2.

FIG. 9 next illustrates the logic flow for restart prioritizer logic circuit 72. As shown in block 190, logic circuit 72 cycles once per bus cycle. For each such cycle, the restart prioritizer logic circuit determines whether any restart indicator is set in the retry table (block 192). If no such restart indicator is set, control returns to block 190 to wait until the next cycle. If, however, a restart indicator is set, control passes to block 194 to select a retry table entry from those having a set restart indicator. Block 194 may be implemented in a number of manners. For example, if only one restart indicator is set, the table entry having such set indicator is selected. For multiple entries that become ready to reissue during the same bus cycle, various arbitration schemes may be utilized, e.g., always prioritizing one entry over another, prioritizing one type of command over another, or prioritizing one type of retry over another, among others.

Once a retry table entry has been selected, control passes to block 196 to notify the request issue logic to restart the selected command, typically by asserting a restart signal and providing the identifier associated with the request to be reissued. Next, block 198 resets the delay and restart indicators in the selected table entry. Control then returns to block 190 to wait for the next bus cycle.

Various alternative logic flows may be utilized for each component 56, 64, 68, 70 and 72 in system controller 30. Moreover, additional or alternative functionality may be supported in each such component, and the various functionalities may be allocated between the different components in other implementations. Furthermore, it will be appreciated that implementation of the above-described logic flows in suitable hardware components is within the abilities of one of ordinary skill in the art having benefit of the instant disclosure.

Various additional modifications may be made to the illustrated implementations without departing from the spirit and scope of the invention. Therefore, the invention lies in the claims hereinafter appended.

What is claimed is:

1. A method of accessing a shared memory, the method comprising:
   (a) issuing a first request to the shared memory, the first request associated with a first requester coupled to the shared memory;
   (b) detecting a second request issued to the shared memory by another requester coupled to the shared memory; and (c) controllably varying a reissue delay before reissuing the first request responsive to detection of the second issued request.

2. The method of claim 1, wherein the shared memory is partitioned into a plurality of cache lines, wherein the first request is associated with a predetermined cache line in the shared memory, and wherein detecting the second request includes detecting a request associated with the predetermined cache line.

3. The method of claim 2, wherein issuing the first request includes storing an identifier associated with the predetermined cache line in a register, and wherein detecting the second issued request includes monitoring accesses to the shared memory for requests, issued by any of a plurality of requesters other than the first requester, and associated with the identifier stored in the register.

4. The method of claim 3, wherein controllably varying the reissue delay includes incrementing a count in response to detecting a request issued by another requester and associated with the identifier stored in the register.

5. The method of claim 4, wherein controllably varying the reissue delay further includes selecting the reissue delay from a plurality of delay values within a range selected in response to the count.

6. The method of claim 5, wherein selecting the reissue delay further includes randomly selecting one of the plurality of delay values within the range.

7. The method of claim 4, further comprising:
   (a) issuing a plurality of requests to the shared memory from the first requester, each associated with a different cache line in the shared memory;
   (b) for each of the plurality of requests, storing an identifier associated with the cache line associated therewith in one of a plurality of registers;
   (c) monitoring accesses to the shared memory for requests, issued by requesters other than the first requester, and associated with the identifiers stored in any of the plurality of registers; and
   (d) in response to detecting a request issued by a requester other than the first requester and associated with an identifier stored in any one of the plurality of registers, incrementing a count associated with the one of the plurality of registers.

8. The method of claim 4, further comprising delaying reissuance of the first request by starting a timer to operate for a predetermined number of cycles associated with the count.

9. The method of claim 1, further comprising reissuing the first request after expiration of the reissue delay, and in response to denial of the first request.

10. The method of claim 1, further comprising:
   (a) monitoring a number of times the first request is reissued; and
   (b) controllably varying the reissue delay further responsive to the number of times the first request is reissued.

11. A method of accessing a shared memory partitioned into a plurality of cache lines and accessible by a plurality of requesters, the method comprising:
   (a) issuing a first request to the shared memory with a first requester among the plurality of requesters; and
   (b) reissuing the first request to the shared memory after a reissue delay, wherein the reissue delay is selected based upon the number of requests, issued by other requesters subsequent to issuance of the first request by the first requester, that are associated with at least one cache line in the shared memory that is further associated with the first request.

12. A circuit arrangement, comprising:
   (a) a first circuit configured to issue a first request to a shared memory that is associated with a first requester; and
   (b) a second circuit configured to controllably vary a reissue delay for the first request responsive to detection of a second request issued to the shared memory by a requester other than the first requester.

13. The circuit arrangement of claim 12, wherein the shared memory is partitioned into a plurality of cache lines, wherein the first request is associated with a predetermined cache line in the shared memory, and wherein the second circuit is configured to detect the second request by detecting a request associated with the predetermined cache line.

14. The circuit arrangement of claim 13, further comprising a register, coupled to the first and second circuits, the register configured to receive an identifier associated with the predetermined cache line, and wherein the second circuit is configured to monitor accesses to the shared memory for requests, issued by any of a plurality of requesters other than the first requester, and associated with the identifier stored in the register.

15. The circuit arrangement of claim 14, further comprising a counter, wherein the second circuit is further configured to increment the counter in response to detecting a request issued by another requester and associated with the identifier stored in the register.

16. The circuit arrangement of claim 15, further comprising a retry delay calculator configured to select the reissue delay from a plurality of delay values within a range that is selected in response to the count.

17. The circuit arrangement of claim 16, wherein the retry delay calculator includes a pseudo random pattern generator configured to output a random number for use in randomly selecting one of the plurality of delay values within the range.

18. The circuit arrangement of claim 15, further comprising a timer configured to cycle for a predetermined number of cycles associated with the count to delay reissuance of the first request.

19. The circuit arrangement of claim 14, further comprising a second register, coupled to the first and second circuits, the second register configured to receive an identifier associated with a second predetermined cache line, the second predetermined cache line associated with another request issued by the first circuit, and wherein the second circuit is further configured to monitor accesses to the shared memory for requests, issued by requesters other than the first requester, and associated with the identifier stored in the second register; and to controllably vary a reissue delay for the other request responsive thereto.

20. The circuit arrangement of claim 12, where in the first circuit is further configured to reissue the first request after expiration of the reissue delay, and in response to denial of the first request.

21. The circuit arrangement of claim 12, wherein the second circuit is further configured to monitor a number of times the first request is reissued, controllably vary there issue delay further responsive to the number of times the first request is reissued.

22. An integrated circuit device comprising the circuit arrangement of claim 12.

23. A program product, comprising a hardware definition program that defines the circuit arrangement of claim 12; and a signal bearing media bearing the hardware definition program, the signal bearing media including at least one of a transmits ion type media and a recordable media.

24. A data processing system, comprising:
   (a) a shared memory; and
   (b) a plurality of requesters coupled to the shared memory, wherein a first requester among the plurality of requesters includes:
      (1) a first circuit configured to issue a first request to the shared memory; and
      (2) a second circuit configured to controllably vary a reissue delay for the first request responsive to detection of a second request issued to the shared memory by another requester among the plurality of requesters.

25. A circuit arrangement configured to controllably vary a reissue delay for a request issued over a memory bus for a predetermined cache line from a shared memory, the circuit arrangement comprising:
   (a) first data storage configured to store an identifier for the predetermined cache line;
   (b) second data storage configured to store a collision count;
   (c) a comparator coupled to the first data storage and the memory bus and configured to increment the collision count in the second data storage in response to a match between the identifier stored in the first data storage and an identifier for a cache line associated with another request on the memory bus; and
   (d) a retry circuit coupled to the second data storage and configured to calculate a delay count based upon the collision count stored in the second data storage, to wait a predetermined time based upon the delay count, and to thereafter assert a restart indicator to initiate reissuance of the request over the memory bus.

26. The circuit arrangement of claim 25, wherein the first and second data storage are disposed in a common register.

27. The circuit arrangement of claim 25, wherein the retry circuit includes a retry calculator including:
   (a) a pseudo random pattern generator configured to generate a pseudo random value; and
   (b) a logic circuit configured to generate the delay count by adjusting the pseudo random value to fall within a predetermined range based upon the collision count.

28. The circuit arrangement of claim 27, wherein the retry circuit further includes:
   (a) a retry table including an entry associated with the predetermined cache line, the entry including a delay count field for storing the delay count and a restart indicator field for storing the restart indicator;
   (b) a retry table control circuit configured to store the delay count in the delay count field in response to a retry response received for the request over the memory bus; and
   (c) a timer coupled to the retry table and configured to periodically decrement the delay count stored in the delay count field and thereafter assert the restart indicator when the delay count has been decremented to a predetermined value.

* * * * *